United States Patent
Hosoda

(10) Patent No.: US 10,581,681 B2
(45) Date of Patent: Mar. 3, 2020

(54) INFORMATION PROCESSING APPARATUS AND CONTROL METHOD THEREOF, CONTROL METHOD OF SYSTEM, AND STORAGE MEDIUM

(71) Applicant: CANON KABUSHIKI KAISHA, Tokyo (JP)

(72) Inventor: Yasuhiro Hosoda, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 17 days.

(21) Appl. No.: 15/901,314

(22) Filed: Feb. 21, 2018

(65) Prior Publication Data

US 2018/0241628 A1    Aug. 23, 2018

(30) Foreign Application Priority Data

Feb. 23, 2017    (JP) .................. 2017-032443

(51) Int. Cl.
   *H04W 48/20*       (2009.01)
   *H04L 12/24*       (2006.01)
   (Continued)

(52) U.S. Cl.
   CPC .......... *H04L 41/0816* (2013.01); *G06F 21/00* (2013.01); *G06F 21/608* (2013.01);
   (Continued)

(58) Field of Classification Search
   CPC ... H04L 41/0816; H04W 76/11; H04W 76/14; H04W 76/15; H04W 84/12; H04W 88/08
   See application file for complete search history.

(56) References Cited

U.S. PATENT DOCUMENTS

| 8,533,788 B2 * | 9/2013 | Newman ............... H04W 12/06 726/4 |
| 2013/0252547 A1 | 9/2013 | Cho |

(Continued)

FOREIGN PATENT DOCUMENTS

| CN | 104052899 A | 9/2014 |
| CN | 106060303 A | 10/2016 |

(Continued)

*Primary Examiner* — Asad M Nawaz
*Assistant Examiner* — Zhaohui Yang
(74) *Attorney, Agent, or Firm* — Canon U.S.A., Inc. IP Division

(57) ABSTRACT

An information processing apparatus includes a memory device that stores a set of instructions, and at least one processor that executes the instructions. When executed, the instructions cause the information processing apparatus to perform operations including effecting control, if operating in a first mode where network settings thereof are performed in cooperation with an external terminal, to activate an access point for wireless communication using an SSID satisfying a predetermined format, and activate a service for accepting settings relating to the network, changing settings relating to the network thereof, at least following the service having received connection information from an external terminal, based on the connection information, and effecting control, if operating in a second mode different from the first mode, to activate an access point using an SSID not satisfying the predetermined format, with the service not accepting connection information from an external device.

13 Claims, 14 Drawing Sheets

| PURPOSE | SERVICE CURRENTLY ACTIVATED | RULE | ADDED TEXT STRING |
|---|---|---|---|
| FOR PRINTING | PRINTING SERVICE | SUFFIX | _Printer |
| FOR APPLICATION A | SETTINGS SERVICE | SUFFIX | _SettingMode |
| FOR APPLICATION B | SETTINGS SERVICE | PREFIX | Config_ |
| FOR AllJoyn-COMPATIBLE APP | AllJoyn Onboarding SERVICE | SUFFIX | _AJ |

(51) Int. Cl.
*H04W 76/15* (2018.01)
*H04W 76/11* (2018.01)
*H04W 84/12* (2009.01)
*G06F 21/60* (2013.01)
*G06F 21/00* (2013.01)
*H04W 48/16* (2009.01)
*H04W 88/08* (2009.01)

(52) U.S. Cl.
CPC ............ *H04W 48/16* (2013.01); *H04W 76/11* (2018.02); *H04W 76/15* (2018.02); *H04W 84/12* (2013.01); *H04W 88/08* (2013.01)

(56) References Cited

U.S. PATENT DOCUMENTS

| | | |
|---|---|---|
| 2016/0048361 A1 | 2/2016 | Sako |
| 2017/0005876 A1* | 1/2017 | Shibata ................ H04W 12/06 |
| 2018/0234844 A1* | 8/2018 | Lavi .................... H04W 12/06 |

FOREIGN PATENT DOCUMENTS

| | | |
|---|---|---|
| CN | 106455007 A | 2/2017 |
| JP | 2013-205982 A | 10/2013 |

\* cited by examiner

FIG. 14

| PURPOSE | SERVICE CURRENTLY ACTIVATED | RULE | ADDED TEXT STRING |
|---|---|---|---|
| FOR PRINTING | PRINTING SERVICE | SUFFIX | _Printer |
| FOR APPLICATION A | SETTINGS SERVICE | SUFFIX | _SettingMode |
| FOR APPLICATION B | SETTINGS SERVICE | PREFIX | Config_ |
| FOR AllJoyn-COMPATIBLE APP | AllJoyn Onboarding SERVICE | SUFFIX | _AJ |

US 10,581,681 B2

INFORMATION PROCESSING APPARATUS AND CONTROL METHOD THEREOF, CONTROL METHOD OF SYSTEM, AND STORAGE MEDIUM

BACKGROUND OF THE INVENTION

Field of the Invention

The present invention relates to an information processing apparatus that activates a software access point for multiple purposes.

Description of the Related Art

There is an increasing number of information processing apparatuses such as multifunction apparatuses, printers, and so forth, that have wireless local area network (LAN) functions. In these information processing apparatuses, there are those that have software access point (AP) functions where the apparatus itself operates as an AP, and can establish a wireless connection with a communication terminal and exchange information without going through an external relay device (referred to as "direct wireless communication"). For example, Japanese Patent Laid-Open No. 2013-205982 describes an information processing apparatus that establishes wireless connection with a mobile terminal, and uses the established wireless connection to exchange audio data and photographic data with the mobile terminal.

Also, there is known in recent years an information processing apparatus that can perform initial settings of an information processing device cooperatively with a communication terminal that a user has. The user that has purchased these information processing apparatuses can, for example, use a communication terminal such as a smartphone or tablet or the like to connect to a software AP that an information processing apparatus has activated, and perform initial settings of the information processing apparatus.

An example of initial settings is setting of a wireless network of an information processing apparatus. Multiple Internet of Things (IoT) advocacy groups are beginning to develop a system where communication terminals and information processing apparatuses cooperate in this way to perform settings for the wireless network of information processing apparatuses.

For example, AllJoyn (a registered trademark), which is an IoT standard promoted by the Linux Foundation has developed an Onboarding service as a framework for performing wireless network settings of devices using a communication terminal. In the AllJoyn Onboarding service, devices such as information processing apparatuses that receive wireless network settings to participate in an office network or home network are referred to as an "Onboardee". A communication terminal that connects to a software AP that the Onboardee provides and transmits wireless network settings to the Onboardee is referred to as an "Onboarder". The Onboarder connects to a software AP that the Onboardee provides, and transmits wireless network settings to the Onboardee. The Onboardee performs wireless network settings of a connection target based on the wireless network settings received from the Onboarder, and thus can connect to an external AP.

There also are, in recent years, information processing apparatuses, such as printers, multifunction apparatuses, and so forth, that have mobile communication functions to perform printing and scanning from communication terminals, using direct wireless communication.

SUMMARY OF THE INVENTION

An information processing apparatus includes a memory device that stores a set of instructions, and at least one processor that executes the instructions. When executed, the instructions cause the information processing apparatus to perform operations including effecting control, upon condition that the information processing apparatus is operating in a first mode where network settings of the information processing apparatus are to be performed in cooperation with an external terminal, to activate an access point for wireless communication using a service set identifier (SSID) that satisfies a predetermined format, and activate a service for accepting settings relating to the network, changing settings relating to the network of the information processing apparatus, at least following the service having received connection information from an external terminal, based on the connection information, and effecting control, upon condition that the information processing apparatus is operating in a second mode that is different from the first mode, to activate an access point using an SSID that does not satisfy the predetermined format, with the service not accepting connection information from an external device.

Further features of the present invention will become apparent from the following description of exemplary embodiments with reference to the attached drawings.

BRIEF DESCRIPTION OF THE DRAWINGS

FIG. 14 is a diagram for describing rules for creating a software AP in a modification.

DESCRIPTION OF THE EMBODIMENTS

In recent years, there are information processing apparatuses, such as printers, multifunction apparatuses, and so forth, that have mobile communication functions to perform printing and scanning from communication terminals, using direct wireless communication. In embodiments of the present invention, network settings of information processing apparatuses, such as printers, multifunction apparatuses, and so forth, is enabled using direct wireless communication from a communication terminal. In this case, the information processing apparatus according to embodiments of the present invention will use software APs for multiple different purposes, such as cases of using direct wireless communication for mobile cooperation, cases of using direct wireless communication for network settings, and so forth.

In cases of using direct wireless communication for initial settings, the information processing apparatus needs to activate a software AP that conforms to a standard for initial settings. For example, a software AP needs to be activated with a service set identifier (SSID) for identifying software APs and the encryption format set so as to conform to this initial settings standard. In a case of using the AllJoyn Onboarding service for initial settings, the information processing device serving as the Onboardee needs to start up a software AP having "AJ" in the SSID.

In cases of using software APs for purposes other than initial settings in the embodiments of the present invention described below, such as cases of using direct wireless communication for mobile printing, an arrangement is provided where a software AP of an SSID, different from an SSID of a format for a settings mode, can be activated, without troubling the user. Software AP settings in the information processing apparatus according to the embodiments of the present invention can be changed by the user. Accordingly, an arrangement is provided where, even in a case where settings of an SSID of a software AP are changed to settings not having "AJ" for example, the SSID of the software AP can be appropriately switched without troubling the user so that initial settings conforming to the Onboarding service can be performed.

Embodiments for carrying out the present invention will be described below with reference to the drawings. It should be noted that the following embodiments do not restrict the invention as laid forth in the Claims. Moreover, not all combinations of features described in the embodiments are indispensable to the present invention.

First Embodiment

Figure 1:
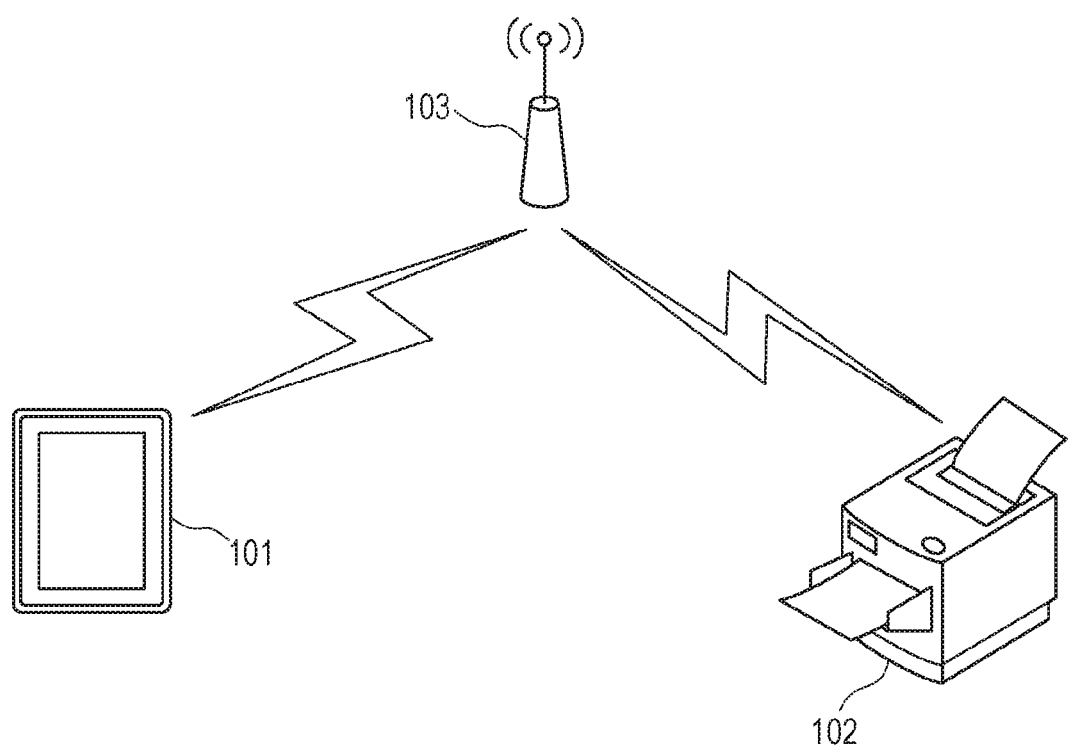
FIG. 1 is a diagram illustrating an overview of a system.

First, the configuration of a communication system according to the present invention will be described with reference to FIG. 1. The system according to the present embodiment includes a communication terminal 101, a multi-function peripheral (MFP) 102, and an access point (AP) 103.

The communication terminal 101 is capable of executing wireless communication confirming to the IEEE 802.11 Standard (hereinafter referred to as "802.11 Standard). The communication terminal 101 can connect to a network that the AP 103 provides, by a user inputting to the communication terminal 101 an SSID and security key for connecting to the AP 103.

The MFP 102 is an information processing apparatus that can receive print data via a network and print. The communication terminal 101 and MFP 102 can perform wireless communication via the AP 103, by the SSID and security key for connecting to the AP 103 being set as wireless network settings for the MFP 102.

Hereinafter in the present embodiment, the communication terminal 101 and MFP 102 executing wireless communication via the external AP 103 will be referred to as "infrastructure wireless communication". The way in which the communication terminal 101 and MFP 102 are connected to execute wireless communication via the external AP 103 will be referred to as "infrastructure connection".

The communication terminal 101 in the infrastructure connection state communicates with the MFP 102 via the AP 103. The communication terminal 101 can transmit print jobs to the MFP 102 via the AP 103. The MFP 102 that has received print jobs executes printing based on the print job.

The MFP 102 can also operate in an AP mode. In a case of operating in an AP mode, the MFP 102 operates as a software AP. The MFP 102 generates an SSID and security key, and behaves as if it were an AP. In a case of the MFP 102 operating in AP mode, the communication terminal 101 can connect to the software AP that the MFP 102 provides.

The user inputs at the communication terminal 101 the SSID and security key to connect to the software AP that the MFP 102 provides. The communication terminal 101 connects to the software AP provided by the MFP 102, based on the connection information that has been input. The communication terminal 101 connected to the AP provided by the MFP 102 can directly perform wireless communication of the MFP 102, without going through a relay device such as the AP 103. Hereinafter in the present embodiment, a form where a communication terminal directly performs wireless communication with the MFP 102 without going through a relay device such as the AP 103 will be referred to as "direct wireless communication".

The communication terminal 101 can communicate with the MFP 102 using direct wireless communication. The communication terminal 101 can perform settings of an external AP to which the MFP 102 is to connect. The communication terminal 101 can also print by connecting to the MFP 102 using direct wireless communication, without going through the AP 103. Thus, the communication terminal 101 can communicate with the MFP 102 using infrastructure wireless communication by infrastructure connection, or direct wireless communication.

Although a smartphone or table personal computer (PC) is exemplified as an example of a communication terminal in the present embodiment, this is not restrictive. Smartphones and tablet PCs are examples of communication terminals capable of executing wireless communication, but other communication terminals may be used, such as a desktop PC or the like.

Although an MFP is exemplified as an example of an information processing apparatus that performs initial settings in cooperation with a communication terminal in the present embodiment, this is not restrictive, and can be applied to various devices capable of direct wireless communication. Examples include single-function scanners, printers, 3D printers, and other such information processing apparatuses. Further application may be made to information processing apparatuses such as televisions, refrigerators, cameras, and so forth. Moreover, application may be made to network settings of wearable terminals and so forth.

Communication Terminal

Figure 2:
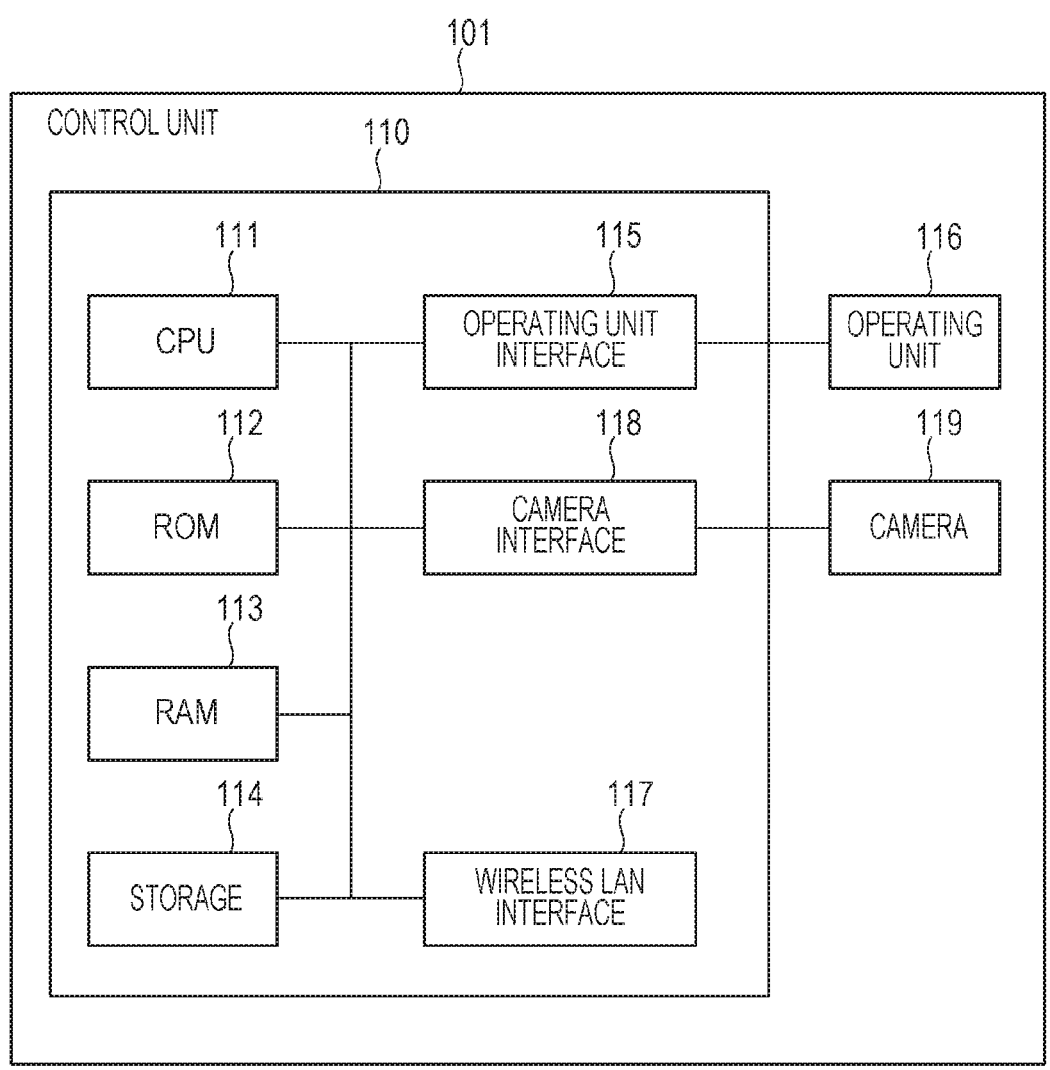
FIG. 2 is a diagram illustrating a hardware configuration of a communication terminal.

Next, the hardware configuration of the communication terminal 101 will be described with reference to FIG. 2. A central processing unit (CPU) 111, included in a control unit 110, reads out control programs stored in read only memory (ROM) 112 or storage 114, and controls the communication terminal 101.

The control unit 110 includes the CPU 111, ROM 112, random access memory (RAM) 113, storage 114, a wireless LAN interface 117, an operation unit interface 115, and a camera interface 118, connected to a bus.

The CPU 111 is a processor that controls the operations of the entire control unit 110. The RAM 113 is volatile memory, and is used as a temporary storage area for loading various types of programs stored in a work area, ROM 112, and storage 114.

The ROM 112 is non-volatile memory, and stores a boot program for the communication terminal 101 and so forth. The storage 114 is non-volatile flash memory that is larger in capacity as compared to the RAM 113. The storage 114 stores control programs for the communication terminal 101. A later-described operating system (OS) 310 and application 300 also are stored in the storage 114.

The CPU 111 executes the boot program stored in the ROM 112 when activating the communication terminal. This boot program is for causing the OS 310 stored in the storage 114 to be read out and loaded to the RAM 113. Upon having executed the boot program, the CPU 111 then executes the program of the OS 310 loaded to the RAM 113, and controls the communication terminal 101. The CPU 111 also stores data used for operations by the control program in the RAM 113, and performs read/write thereof.

Note that in the communication terminal 101, one CPU 111 executes the various types of processing illustrated in the later described flowcharts, but other modes may be employed. For example, an arrangement may be made where multiple CPUs or microprocessors (MPU) collaborate to execute the various types of processing illustrated in the later described flowcharts. Part of the processing may be executed using hardware circuits such as application specific integrated circuits (ASIC), field-programmable gate arrays (FPGA), or the like.

The operation unit interface 115 connects an operating unit 116 and the control unit 110. The operating unit 116 has a touch panel capable of detecting touch operations of the user, and a display panel that displays various types of screens. The operating unit 116 functions as a display unit that displays information, and an accepting unit that accepts user instructions. The operating unit 116 displays various screens provided by the OS 310 and an application 300. The user can also input desired operation instructions to the communication terminal 101 by performing touch operations on the operating unit 116 using an object such as a finger or the like. The operating unit 116 is also provided with hardware keys, which can be pressed by the user to input operation instructions to the communication terminal 101.

The camera interface 118 connects the control unit 110 and a camera 119. The camera 119 takes images in accordance with imaging instructions from the user. Photographs imaged by the camera 119 are stored in a predetermined region of the storage 114.

The wireless LAN interface 117 provides a wireless client function for performing wireless communication conforming to the 802.11 Standard. The wireless LAN interface 117 connects to an external AP and performs wireless communication conforming to the 802.11 Standard. The external AP may be the MFP 102 that operates in access point mode or may be the AP 103.

Software Configuration of Communication Terminal 101

Figure 3:
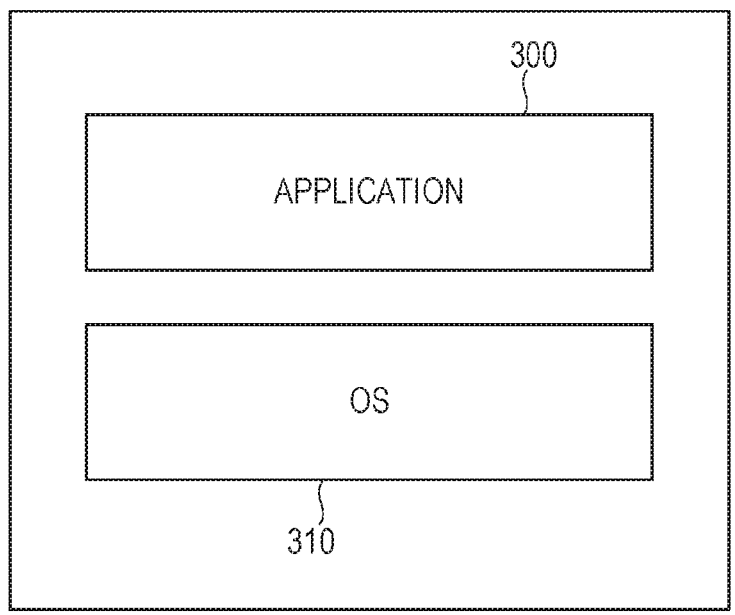
FIG. 3 is a diagram illustrating a software configuration of the communication terminal.

Next, the software configuration of the communication terminal 101 will be described with reference to FIG. 3. FIG. 3 is a functional block diagram of software realized by the CPU 111 reading out a control program stored in the ROM 112 or storage 114.

The OS 310 is basic software for controlling the operations of the entire communication terminal 101. Various applications can be installed in the communication terminal 101, including the later-described application 300. The OS 310 exchanges information among these applications, and can change screens displayed on the operating unit 116 in accordance with instructions received from the applications. Wireless communication by the wireless LAN interface 117 is also controlled in accordance with instructions received from the applications. Upon connecting to an AP through the wireless LAN interface 117, the OS 310 stores information relating to the AP in the storage 114 as history of wireless communication. The user can confirm information relating to the AP in a screen (omitted from illustration) regarding wireless settings, provided by the OS 310. The application 300 can call up functions to be provided as an application program interface (API) or application-oriented framework, and information relating to APs that the OS 310 manages can be obtained. Also, the later-described application 300 can control the wireless LAN interface 117 and search for APs in the proximity, by the OS 310 calling up functions to be provided as an application program interface (API) or application-oriented framework.

The application 300 is an application installed in the communication terminal 101. Applications for various purposes can be installed in the communication terminal 101 besides the application 300, although these are omitted from illustration in FIG. 3. The application 300 provides functions to the user of the communication terminal 101, for performing network settings for information processing apparatuses present around the communication terminal 101. The application 300 also provides print functions for causing an information processing apparatus such as an MFP regarding which network settings have been performed, to perform printing.

MFP

Figure 4:
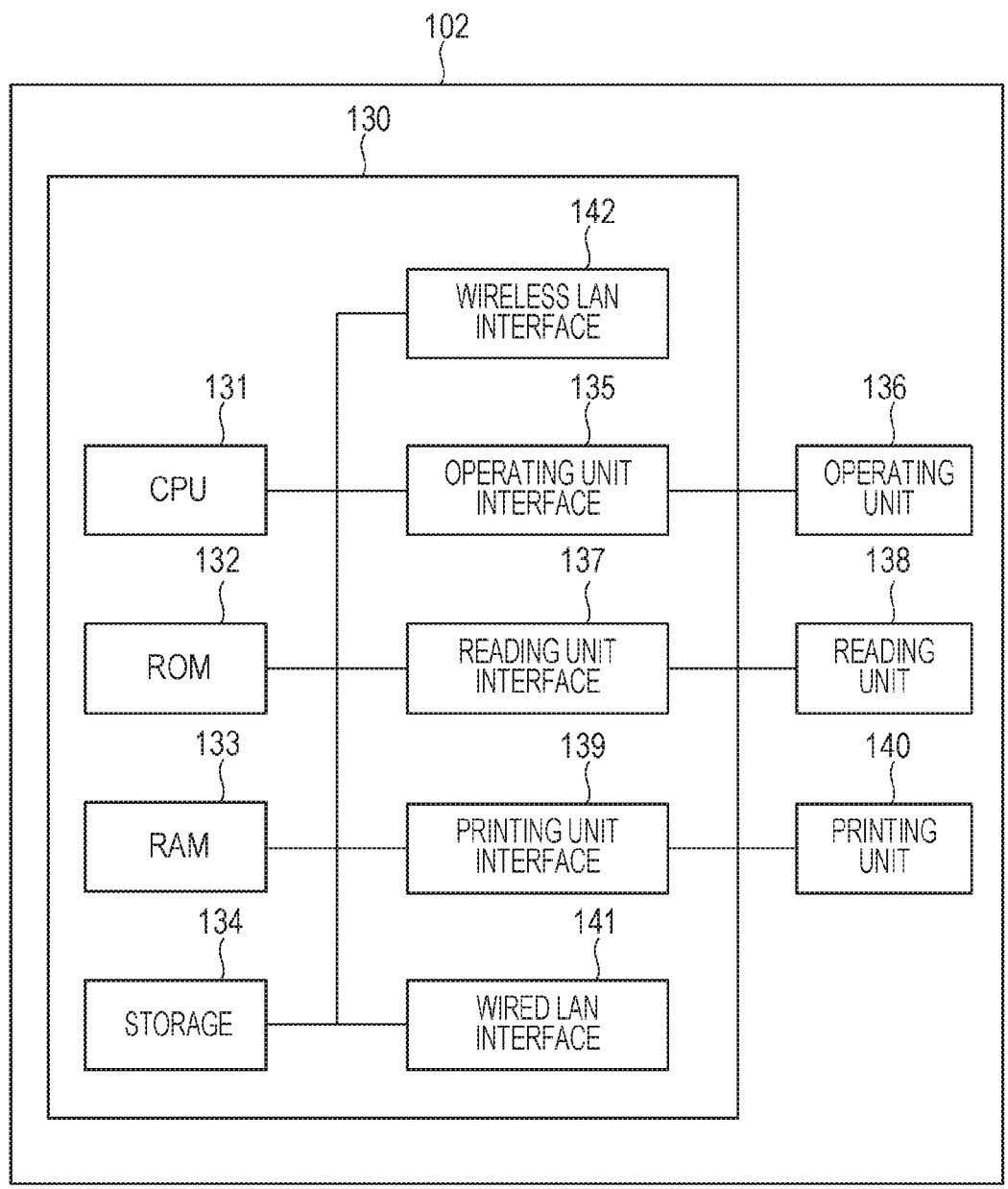
FIG. 4 is a diagram illustrating a hardware configuration of a multi-function peripheral (MFP).

Next, the MFP 102 will be described. FIG. 4 is a block diagram illustrating the hardware configuration of the MFP 102. The MFP 102 has a reading function of reading images, and a printing function of printing images on sheets.

A control unit 130 including a CPU 131 controls the operations of the entire MFP 102. The CPU 131 reads out control programs stored in ROM 132 or storage 134, and performs various types of control, such as printing control and reading control. The ROM 132 stores control programs that the CPU 131 can execute. RAM 133 is main storage memory of the CPU 131, and is used as work area or a temporary storage area for loading commands of various types of control programs. The storage 134 is a storage unit that stores print data, image data, various types of programs, and various types of setting information.

While the MFP 102 according to the present embodiment executes various types of processing illustrated in the later-described flowcharts with one CPU 131 using one memory device (RAN 133), other arrangements may be made. For example, multiple processors, RAM, ROM and storage devices may collaborate to execute the various types of processing illustrated in the later-described flowcharts.

An operating unit interface 135 connects an operating unit 136 and a control unit 130. The operating unit 136 is provided with a liquid crystal display unit having touch-panel functions, various types of hardware keys, and so forth, and functions as a display unit displaying information and an accepting unit accepting user instructions.

A reading unit interface 137 connects a reading unit 138 and the control unit 130. The reading unit 138 reads original documents and generates read images. The generated read images are transmitted to an information processing apparatus, used for printing, or the like.

A printing unit interface 139 connects a printing unit 140 and the control unit 130. The printing unit 140 prints images on sheets, based on externally-received print data.

The control unit 130 is connected to an unshown network via a wired LAN interface 141. The wired LAN interface 141 transmits images and information to an information processing apparatus on the unshown network, and receives print data and information from an information processing apparatus on a wired LAN.

Further, the control unit 130 has a wireless LAN interface 142. The wireless LAN interface 142 provides functions of a wireless client for connecting to an external AP and performing wireless communication, and functions of a software AP where the MFP 102 behaves as an AP. Upon an SSID and security key for connecting to the AP 103 being set as wireless network settings for the MFP 102, the MFP 102 can perform wireless communication via the AP 103.

A software AP is activated in a case where the AP mode is on. In a case where the AP mode has been set to on by the user, the CPU 131 collaborates with the wireless LAN interface 142 to behave as a software AP to which an external device can connect. The SSID and security key for connecting to the software AP is displayed on the operating unit 136 of the MFP 102 in accordance with user operations.

Software Configuration of MFP 102

Figure 5:
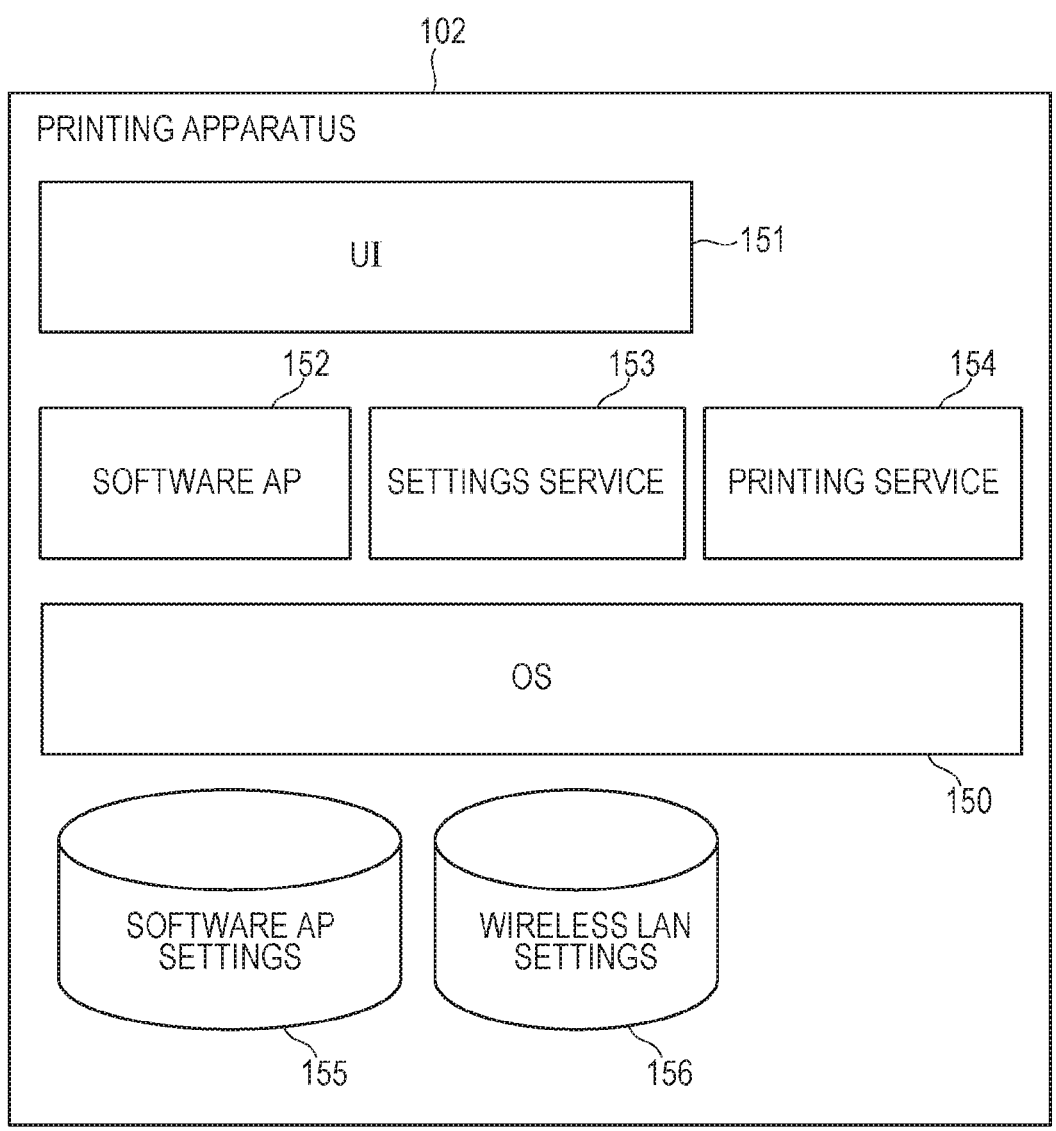
FIG. 5 is a diagram illustrating a software configuration of the MFP.

Next, the software configuration of the MFP 102 will be described with reference to FIG. 5. FIG. 5 is a block diagram illustrating functions of software realized by the CPU 131 reading out control programs stored in the ROM 132 and storage 134, and data storage area of the storage 134. An OS 150 is basic software for controlling the operations of the overall MFP 102. A user interface (UI) 151 is software that controls screens displayed on the operating unit 136 via the operating unit interface 135. A software AP 152 is software that collaborates with the wireless LAN interface 142 and activates the software AP. The software AP 152 activates the software AP based on the SSID, network key, and encryption type settings stored in software AP settings 155. The software AP settings 155 is a storage area within the storage 134, storing settings information for cases of activating the software AP.

Note that the MFP 102 according to the present embodiment is capable of activating one software AP. The MFP 102 according to the present embodiment can operate the functions of the wireless client and functions of the software AP at the same time. That is to say, although the wireless network interface is one, two logical network interfaces are provided, which are an interface to be used as the software AP and an interface to connect to an external AP as a wireless client. Here, for the sake of facilitating description, an interface for exchanging data with an external AP in infrastructure mode will be referred to as "wlan0". An interface for exchanging data via software AP will be referred to as "wlan1". The software AP 152 operates the interface "wlan1" as a software AP in collaboration with the wireless LAN interface 142.

A settings service 153 is a service for cooperating with an external device to perform settings of the MFP 102. The settings service 153 receives settings values from an external terminal such as the communication terminal 101, via the software AP that the MFP 102 has activated. The settings service 153 also changes operation settings of the MFP 102 based on the received settings values. For example, upon receiving settings of an external AP (settings of a wireless network) to which the MFP 102 should connect, from an external terminal, the settings service 153 stores these settings in wireless LAN settings 156. The wireless LAN settings 156 is a region within the storage 134 storing connection information necessary for the MFP 102 to connect to an external AP (e.g., the AP 103). The MFP 102 performs wireless connection to the external AP based on connection information stored in the wireless LAN settings 156.

Printing service 154 is a service for externally receiving print data, and performing printing based on the received print data. The printing service 154 receives print data from an external device via the wired LAN interface 141 and wireless LAN interface 142. In a case of receiving print data from an external device via the wireless LAN interface 142, the printing service 154 can also receive print data by direct wireless communication via a logical network interface running as "wlan1". Print data can also be received by infrastructure wireless communication via a logical network interface running as "wlan0". The printing service 154 that has received the print data prints images based on the received print data onto sheets, in collaboration with the printing unit 140.

Now, the MFP 102 according to the present embodiment uses the software AP for direct wireless communication with external devices for multiple purposes. First, there are cases of using the software AP to receive print data from the communication terminal 101 using direct wireless communication. Another case of using the software AP is when exchanging information to perform initial settings of the network of the MFP 102, via the communication terminal 101 that the user has.

Now, in a case of performing initial settings of then network of the MFP 102 via the communication terminal 101, the devices will have to exchange information with each other in accordance with a sequence set beforehand according to an open standard or a proprietary standard or the like. In this case, activation may need to be performed using an SSID that follows a predetermined format, so that the settings application side can easily tell that the software AP is for initial settings. For example, in a case of performing communication following the sequence predefined by the AllJoyn Onboarding service, a software AP where the SSID name is "*_AJ" needs to be activated. Note that the asterisk "*" is used to mean an optional text string. Hereinafter, "*" will be used as a symbol to mean an optional text string in the present embodiment.

The MFP 102 settings service can be switched on and off by user operations in the present embodiment. This has been included taking into consideration that there are users who want to switch the settings service off after setting of the MFP 102 has been completed, so that the settings cannot be improperly changed from the outside.

Now, in a case where the name of the SSID of the software AP that the MFP 102 has activated is "*_AJ" even though the settings services has been set to off, problems may occur. For example, in a case where the settings service of the MFP 102 is off, the MFP 102 cannot cooperate with the settings application. However, it appears from the settings application side that a software AP of a settable MFP is in the proximity, which may confuse the user. For example, even if the user tries to proceed with settings from the settings application, cooperation with the MFP 102 that does not have the settings service activated will not work, and an error may be returned.

The above problem is taken into consideration in the present embodiment, and switching of the SSID of the software AP is enabled in accordance with the purpose of use of the software AP, without troubling the user. Specifically, while a predetermined settings service is activated, control is performed so that the SSID of the software AP to be activated is an SSID according to a predetermined format. In a case where the software AP is to be activated according to a different purpose from the predetermined settings service, such as receiving print data or the like, control is performed so that the SSID is different from the predetermined format.

Figure 6:
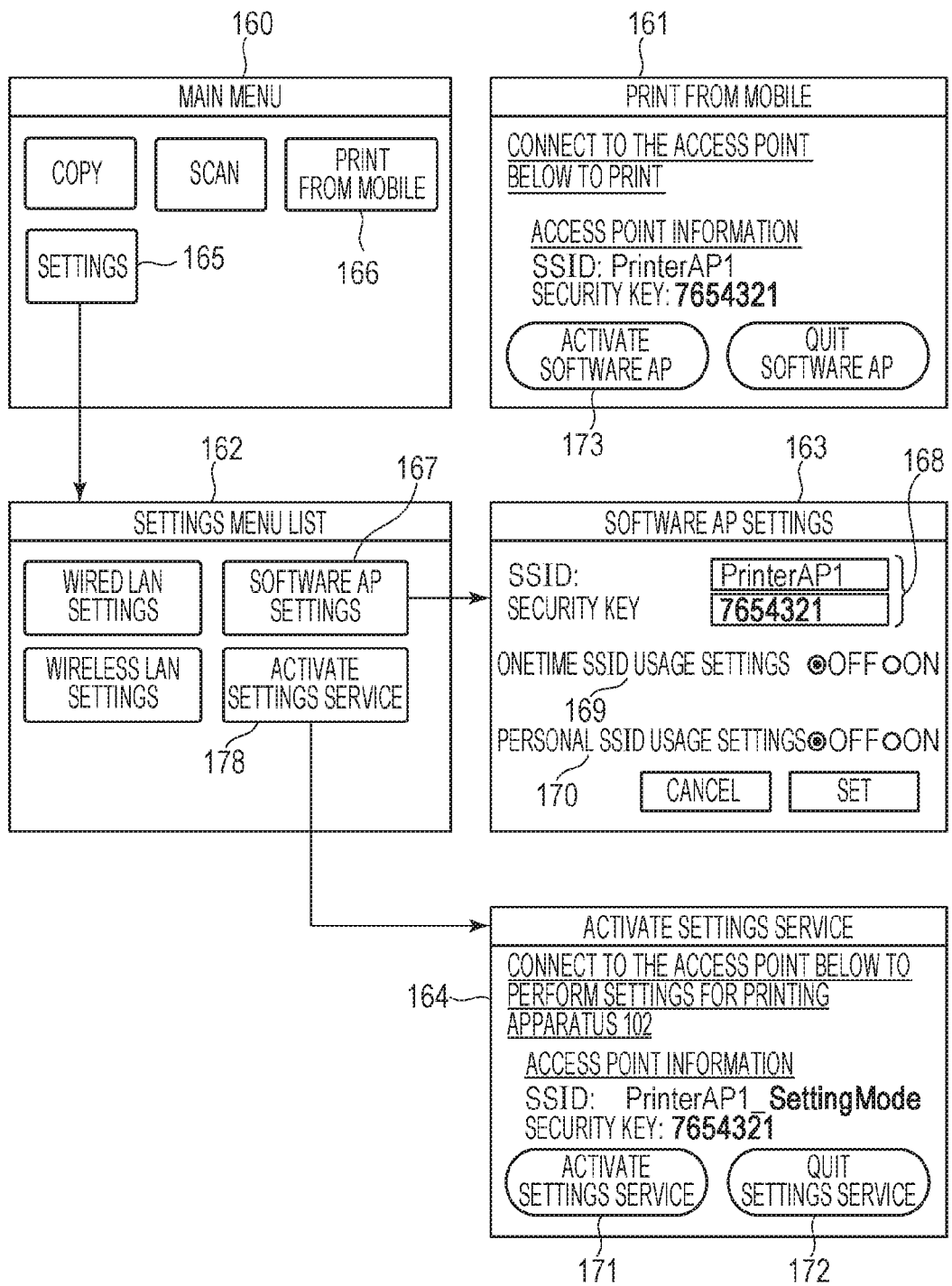
FIG. 6 is a diagram for describing a screen displayed on an operating unit of the MFP.

First, setting of the SSID and security key of the software AP will be described. FIG. 6 illustrates screens displayed on the operating unit 136 of the MFP 102. A main menu screen 160 is a menu screen for selecting various functions (e.g., copy functions and scan functions) that the MFP 102 has, and a settings menu. Upon detecting that the user has selected a button for copy functions or scan functions, the MFP 102 transitions to a screen for executing the copy functions or scan functions that the MFP 102 has.

Also, upon detecting that the user has selected a settings button 165, the MFP 102 transitions the screen displayed on the operating unit 136 to a settings screen (omitted from illustration) for selecting setting items. Various settings can be performed from the settings screen, such as settings relating to printing, settings relating to power conservation, network-related settings, and so forth. Accordingly, it is difficult to perform all settings within the same screen. Thus, transition is made to an individual settings screen for each setting item, and settings are performed for multiple functions. The MFP 102 transitions the screen displayed on the operating unit 136 to a network-related settings screen 162 in accordance with the user having selected a button to perform network-related settings via the unshown settings screen.

The user can perform settings of the wired LAN interface 141 and the wireless LAN interface 142 that the MFP 102 has, via the settings screen 162. The user can also select a software AP settings button 167 to perform settings of the software AP used in direct wireless communication.

The user can display a screen 163 for setting the SSID and security key for when activating the software AP, by selecting the software AP settings button 167. Connection information set via the screen 163 is shared between cases of activating the software AP for printing and cases of activating the software AP for settings.

Text boxes 168 for input of the SSID and security key are displayed in the screen 163. The user can edit settings of the SSID and security key by selecting the text box 168 regions, and using an unshown software keyboard. When a set key is selected, the MFP 102 changes the settings of the software AP for the MFP 102 to activate, based on the SSID and security key edited via the text boxes 168.

The screen 163 can also be used to performs settings 169 using a onetime SSID and security key, settings 170 using a personal SSID, and so forth. Upon settings for using a onetime SSID and security key having been set to on, the settings are such that the software AP is activated using a random SSID and security key when the MFP 102 activates the software AP. A personal SSID is an SSID and security key that differs for each login user, and is used in a case where the user of the MFP 102 can be identified by a login function. The personal SSID may be obtained from a user database (omitted from illustration) stored in the MFP 102 or an external cooperating servicer, or may be automatically generated based on personal information stored in the user database. In a case where onetime SSID usage and personal SSID usage are both off, the software AP is activated based on the SSID and security key settings edited and stored via the text boxes 168.

Next, a method where the communication terminal 101 and MFP 102 cooperate to perform settings of the MFP 102 will be described. As one example of settings, a case of performing settings of a wireless network that the MFP 102 uses for infrastructure connection will be described in the present embodiment. In the settings screen 162, the user selects an activate settings service button 178, which brings up an activate settings service screen 164 of the settings service. Operation to activate or stop the settings service can be performed in the screen 164. While the settings service is activated, the MFP 102 controls the software AP to activate using an SSID following a predetermined format (e.g., "*_SettingMode"). Upon the settings service and the software AP for the settings service being activated, the MFP 102 is in a state capable of cooperation with the settings application of the communication terminal 101.

Wireless Network Settings Using Communication Terminal 101

Figure 7:
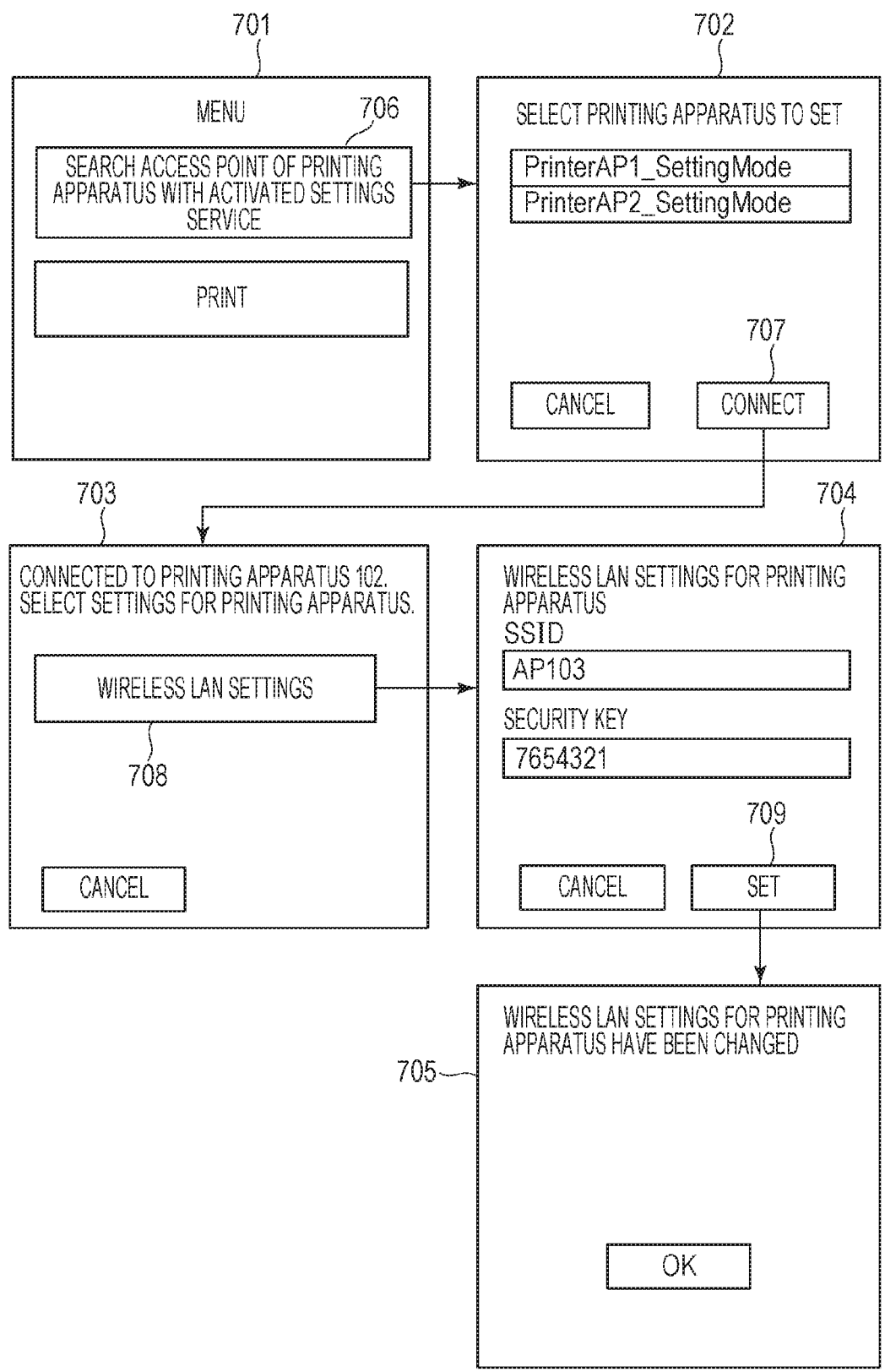
FIG. 7 is a diagram for describing a screen displayed on an operating unit of the communication terminal.

Next, the sequence at the communication terminal 101 side will be described. FIG. 7 is an exemplification of a settings screen displayed on the operating unit 116 of the communication terminal 101. A screen 701 is an example of an operating menu screen that the settings application 300 displays. Selecting a button 706 in the screen 701 enables access points to be searched. In a case where the button 706 is selected, the communication terminal 101 searches for an access point, and displays a screen 702 for selecting devices which are the object of setting. Here, in order to make it easier to discover corresponding devices regarding which the communication terminal 101 itself can set, APs found in the search that have a predetermined text string at the prefix or suffix of the SSID are extracted and displayed. SSIDs that do not have the predetermined text string are not displayed in the screen 702. In the present embodiment, a list of APs of which the SSID is "*_SettingMode" is displayed.

By selecting the AP of the MFP 102 from the list and pressing the connect button 707, the user can establish a connection between the communication terminal 101 and MFP 102. Once the connection is established, a screen 703 for selecting setting items for a printing apparatus is displayed. The user selects a button 708 to display a screen 704 for inputting information of an external AP to which the printing apparatus should connect. For example, the user inputs the SSID and security key of the AP 103 and presses a set button 709. Although an example is illustrated in the present embodiment where the user inputs the SSID and security key, this is not restrictive. For example, the communication terminal 101 may search for and list APs in the proximity where the suffix of the SSID is not "_SettingMode", and have the user to select from these. Alternatively, the communication terminal 101 may display a list of APs to which it has connected in the past, and enable the user to make a selection from these.

Upon detecting that the set button 709 has been pressed, the communication terminal 101 transmits information of the AP to which the MFP 102 should connect to the MFP 102, using direct wireless communication. A screen 705 indicating that settings are complete is displayed once transmission has been completed.

On the other hand, the MFP 102 uses the information of the wireless LAN AP received from the communication terminal 101, and performs settings of its own wireless network. For example, the MFP 102 stores the SSID "AP 103" and security key "76564321" shown in the screen 704 in the wireless LAN settings 156 within the storage 134 as wireless network settings of a connection destination. When storage is complete, the wireless LAN interface 142 is reset, and connection to the external AP based on the new network settings is attempted. Accordingly, the MFP 102 can participate in a wireless network that an external AP provides, based on the wireless network settings received from the communication terminal 101.

External Cooperation

Returning to the description in FIG. 6, description will be made regarding a screen when accepting print data from the communication terminal 101. The user can display the screen 161 by pressing a print from mobile button 166 in the main menu screen 160. Operations of activating and stopping a general-purpose software AP used for printing cooperation, where print data is accepting using direct wireless communication, can be performed from the screen 161.

While the software AP is activated, information for accessing the software AP (SSID and security key) is displayed on the screen 161. Although printing cooperation where print data is received from the MFP 102 is exemplified in the present embodiment as an example of mobile cooperation, this is not restrictive. For example, the MFP 102 can perform scanning cooperation, where a read image obtained by reading an original document at the reading unit 138 is transmitted to the communication terminal 101. Further, box cooperation, where files and images stored in a shared box of the MFP 102 are downloaded to the communication terminal 101, may also be performed.

In the present embodiment, software AP activation for external cooperation, such as printing cooperation, scanning cooperation, box cooperation, and so forth, is performed by controlling the software AP to be activated using an SSID that is different from the predetermined format for the settings service.

Figure 8:
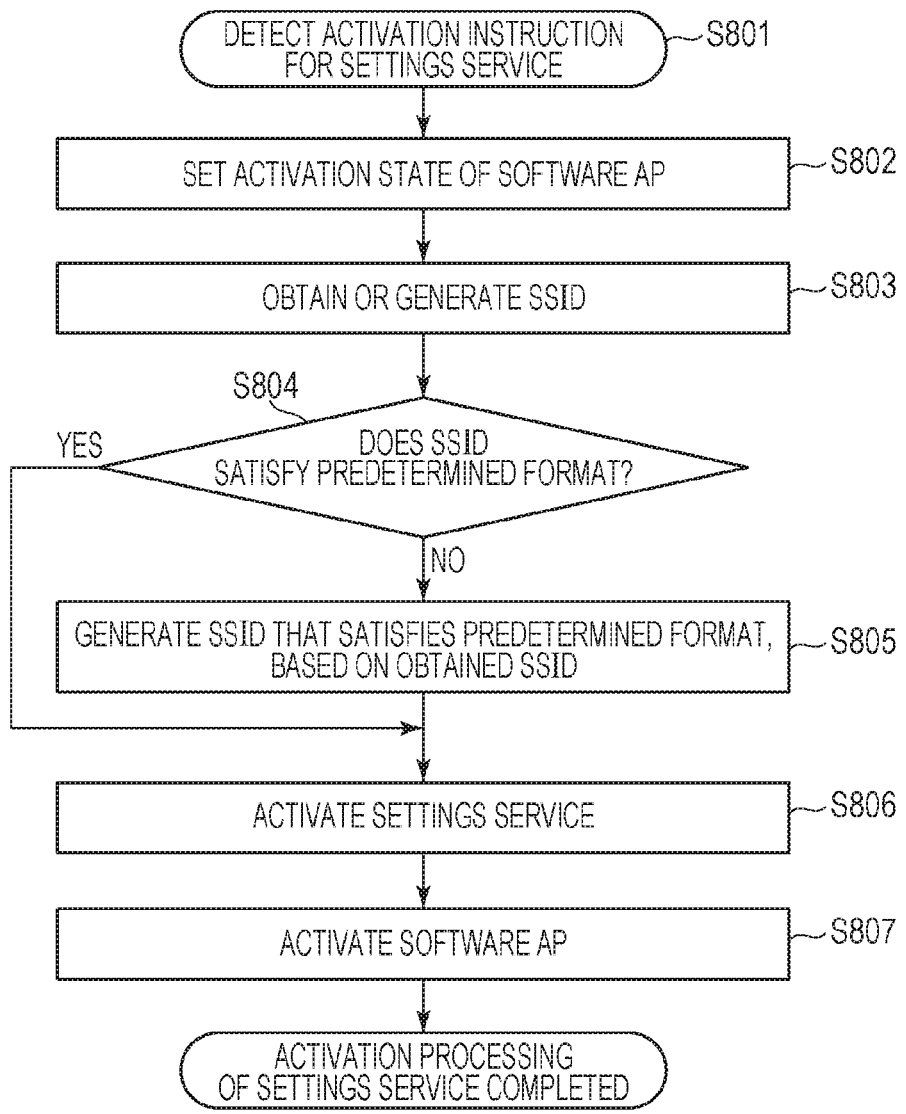
FIG. 8 is a flowchart illustrating control of the MFP.
Figure 9:
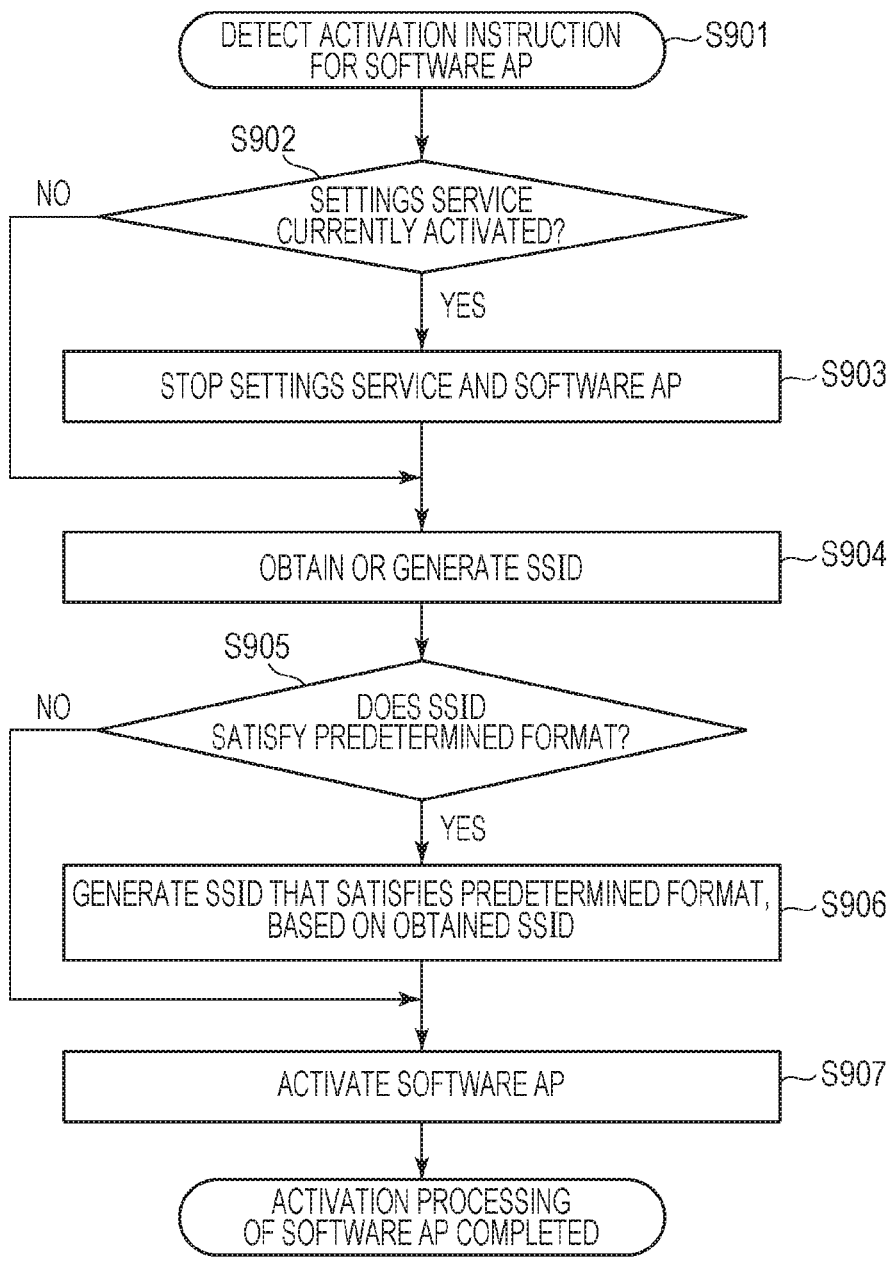
FIG. 9 is a flowchart illustrating control of the MFP.
Figure 10:
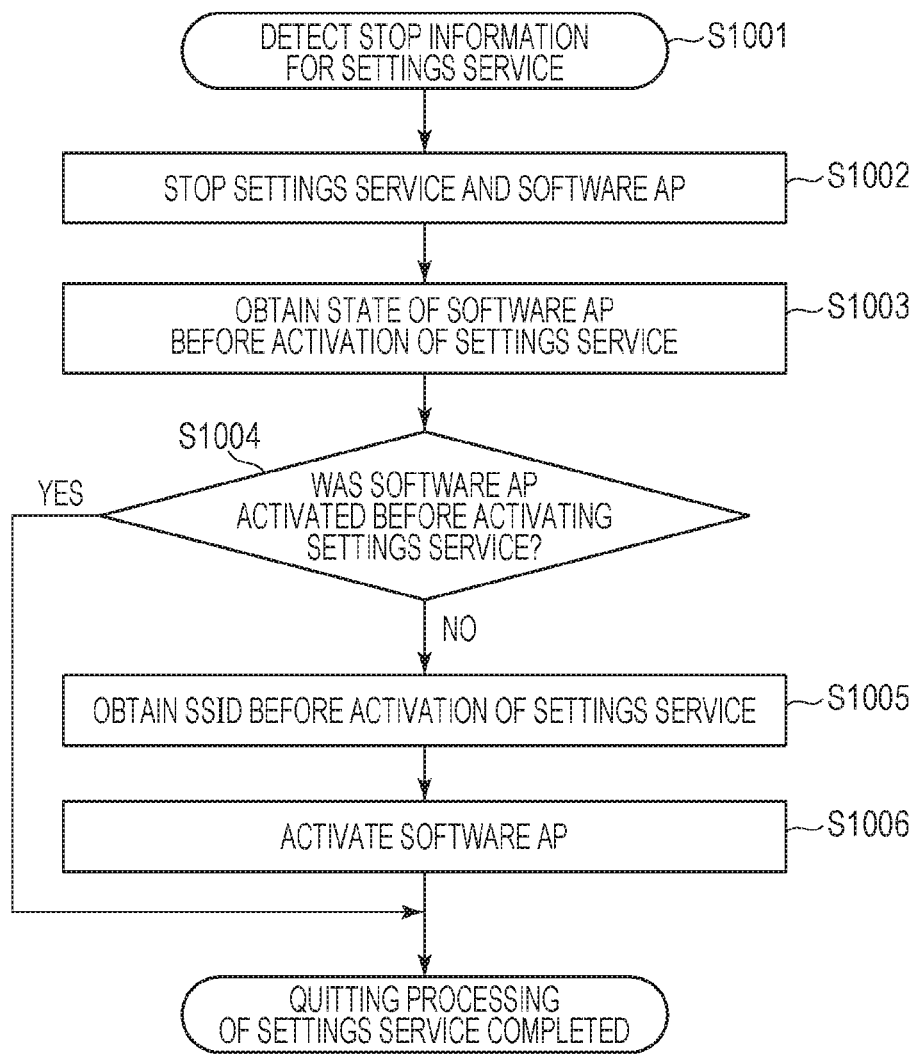
FIG. 10 is a flowchart illustrating control of the MFP.

A specific method for switch software AP SSIDs in accordance with the purpose of using the software AP without troubling the user will be described with reference to the flowcharts in FIGS. 8 through 10. The operations (steps) of the flowcharts in FIGS. 8 through 10 are realized by the CPU 131 reading out a program for realizing the control modules stored in the ROM 132 or storage 134, loading the program to the RAM 133, and executing the program. Note that the processing in the flowcharts is realized by the OS 150 that is a control program, UI 151, software AP 152 and settings service 153 operating collaboratively.

FIG. 8 is a flowchart illustrating operations of the MFP 102 in a case where the user has pressed an activate settings service button 171 in the screen 164. In S801, upon having detected that the user has pressed the button 171 in the screen 164, the CPU 131 starts activation processing of the settings service. In S802, the CPU 131 stores the current state of the software AP. In a case where the software AP has not been activated, storage is made to the effect that the software AP is not activated. In a case where the software AP has been activated, storage is made to the effect that the software AP is activated. In a case where the software AP currently is activated, settings (SSID, security key, encryption format) of the software AP currently activated are stored. Note that the processing in S802 is processing to store information to restore the state of the software AP before activation of the settings service.

Next, in S803, the CPU 131 obtains or generates the SSID and security key using one of the following techniques. In a case where the software AP is activated, the SSID and security key of the activated software AP are obtained. On the other hand, in a case where the software AP is stopped, the SSID and security key of the software AP to be subsequently activated are obtained based on the settings of the software AP. In a case where usage settings for onetime SSID and personal SSID are off, the settings for the SSID and security key stored in the storage 134 are obtained. On the other hand, in a case where the usage settings for onetime SSID are on, the CPU 131 randomly generates an SSID and security key. Further, in a case where usage settings for personal SSID are on, the SSID and security key associated with the account of the user that has instructed activation of the settings service are obtained.

In S804, the CPU 131 determines whether or not the SSID obtained or generated in S803 satisfies the predetermined format. In a case where the predetermined format is satisfied, the processing in S805 is skipped, and the flow advances to S806. In a case where the predetermined format is not satisfied, the flow advances to S805, where judgement is made regarding whether or not the format of "*_SettingMode" is satisfied in the present embodiment. The CPU 131 judges whether or not a text string matching the predetermined text string pattern "_SettingMode" stored beforehand is included in the obtained SSID. In a case where a matching text string is included, judgment is made regarding whether or not the position of that text string is at the predetermined position (suffix in the present embodiment). In a case where a matching text string is included, and the text string is at the predetermined position, judgment is made that the predetermined format is satisfied. In a case where a matching text string is not included, or a matching text string is included but the text string is not at the predetermined position, judgment is made that the predetermined format is not satisfied. Although an arrangement is exemplified in the present embodiment where the predetermined position is the suffix, this is not restrictive, and the predetermined position may be the prefix, for example. Also, although an arrangement is exemplified in the present embodiment where the predetermined format is "*_SettingMode", this is not restrictive. Depending on the standard of the settings service, cases are conceivable where standards established at different times or different standards are merged, and multiple formats, such as formats that were originally used by settings services of separate formats but then later merged, are permissible. In this case, the CPU 131 stores the multiple formats (naming rules of SSIDs) that can be used by the settings service in the storage 144, and judgment can be made whether any one of the multiple formats is satisfied. In a case where one of the formats is satisfied, the flow advances to S806, and if none of the formats is satisfied, the flow is advanced to S805.

In S805, the CPU 131 generates an SSID that satisfies the predetermined format, based on the obtained SSID. Control is effected in the present embodiment so that the SSID satisfies the format of "*_SettingMode", as one example. For example, the CPU 131 generates an SSID that satisfies the predetermined format by adding "*_SettingMode" to the suffix of the SSID. Note that in a case where conditions such as the maximum number of characters of the SSID are already set in the standard to which the settings service or settings application confirms, text string operation is performed so that the conditions are satisfied, and an SSID following the standard is generated.

In S806, the CPU 131 activates the settings service. Activating the settings service here means to transition from a state where settings functions provided by the settings service 153 cannot be externally used, to a state where settings functions provided by the settings service 153 can be externally used. For example, the CPU 131 transitions the settings service in a stopped state to an activated state, so that the settings service 153 can be externally used. Note that activation of the settings service is not restricted to this. For example, the CPU 131 may make whether the settings service 153 is externally usable or not to differ by communication control such as packet filtering or port filtering. In this case, the settings service 153 stands by for communication from the outside in an activated state. The CPU 131 switches between the state where the settings function provided by the settings service can be externally used and the state where the settings function provided by the settings service cannot be externally used, by switching communication control rules by packet filtering or port filtering.

In S807, the CPU 131 activates the software AP using the SSID that satisfies the predetermined format. In a case where the software AP is already activated, the CPU 131 stops the software AP that is activated, and activates the software AP using the SSID that satisfies the predetermined format.

According to the series of processing in FIG. 8 described above, when activating the settings service, the software AP can be activated using an SSID that satisfies the predetermined format. Next, a case of control of activating the software AP with an SSID that differs from the predetermined format for the settings service, in a case of activating the software AP for external cooperation such as printing cooperation, scanning cooperation, box cooperation, and so forth, will be described with reference to FIG. 9.

FIG. 9 is a flowchart illustrating operations of the MFP 102 in a case of having instructed activation of the software AP from the screen 161 for the purpose of external cooperation. In S901, upon having detected that the user has pressed the button 173 in the screen 161, the CPU 131 starts activation processing of the software AP. In S902, the CPU 131 judges whether or not the settings service is activated. In a case where the settings service is activated, the flow advances to step S903, while the flow advances to S904 in a case where the settings service is not activated.

The CPU 131 transitions the settings service to a state that cannot be used from the outside in S903. The activated software AP is also stopped.

In S904, the CPU 131 obtains or generates the SSID and security key to be sued for the software AP, based on the settings of the software AP. In a case where usage settings for onetime SSID and personal SSID are off, the settings for the SSID and security key stored in the storage 134 are obtained. On the other hand, in a case where the usage settings for onetime SSID are on, the CPU 131 randomly generates an SSID and security key. Further, in a case where usage settings for personal SSID are on, the SSID and security key associated with the account of the user that has instructed activation of the settings service are obtained. Upon obtaining or generating of the SSID and security key being completed, the flow advances to S905.

In S905, the CPU 131 determines whether or not the SSID obtained satisfies the predetermined format. In a case where the predetermined format is satisfied, the flow advances to S906. In a case where the predetermined format is not satisfied, the processing in S906 is skipped, and the flow advances to S907.

In S906, the CPU 131 generates an SSID that does not satisfy the predetermined format, based on the SSID obtained in S904. For example, the CPU 131 deletes the "_SettingMode" included at the suffix of the SSID, and generates an SSID that does not satisfy the predetermined format.

In S907 the CPU 131 activates the software AP using an SSID that is different from the predetermined format. According to this series of processing, in a case of the user giving instructions to activate the software AP to be used for printing or the like, the software AP can be activated using an SSID that does not satisfy the predetermined format for the settings service.

Next, control effected in a case of ending the settings service will be described with reference to the flowchart in FIG. 10. FIG. 10 is a flowchart illustrating the operations of the MFP 102 in a case where the user instructs stopping of the settings service from the screen 164. In S1001, the CPU 131 detects that the user has pressed the button 172 in the screen 164, and starts stopping processing of the settings service. In S1002, the CPU 131 transitions the settings service to a state that cannot be used from the outside. The CPU 131 also stops the activated software AP. Next, in S1003, the CPU 131 obtains the state of the software AP before the settings service was activated, that has been stored in S802.

In S1004, the CPU 131 judges whether or not the software AP had been activated, based on the state of the software AP before starting of the settings service obtained in S1003. In a case where the fact that the software AP was not activated is stored, the series of processing ends. In the other hand, in a case where the fact that the software AP was activated is stored, as the state of the software AP, the flow advances to S1005.

In S1005, the CPU 131 obtains the software AP settings (SSID, security key, encryption format) stored in S802. In S1006, the CPU 131 activates the software AP based on the obtained software AP settings. The state of the software AP before activating the settings service can be restored by the processing in S1005.

As described above, the software AP can be activated with the SSID automatically switched to an appropriate SSID, in conjunction with the usage purpose of the AP function in the present embodiment. Accordingly, the trouble of the user manually changing the settings of the software AP can be omitted. Control is effected so that the software AP is automatically activated following a standard corresponding to the settings service regarding which the user has performed an operation to activate, triggered by this user operation. Accordingly, the user can use the settings service without giving thought to specifications such as IoT standards or setting standards.

Also, in a case where the setting service is not activated, the software AP is kept from being activated using the SSID for the settings service. Thus, the user can be prevented from becoming confused.

Second Embodiment

Control where settings of a shared software AP are provided regardless of the purpose of using the software AP as illustrated in screen 163 has been described in the first embodiment. In comparison with this, a configuration is made in the second embodiment where different settings can be stored for each usage purpose of the software AP. Description will also be made in the second embodiment regarding control where an appropriate SSID is stored for each usage purpose of the software AP when accepting setting changes of the software AP.

Figure 11:
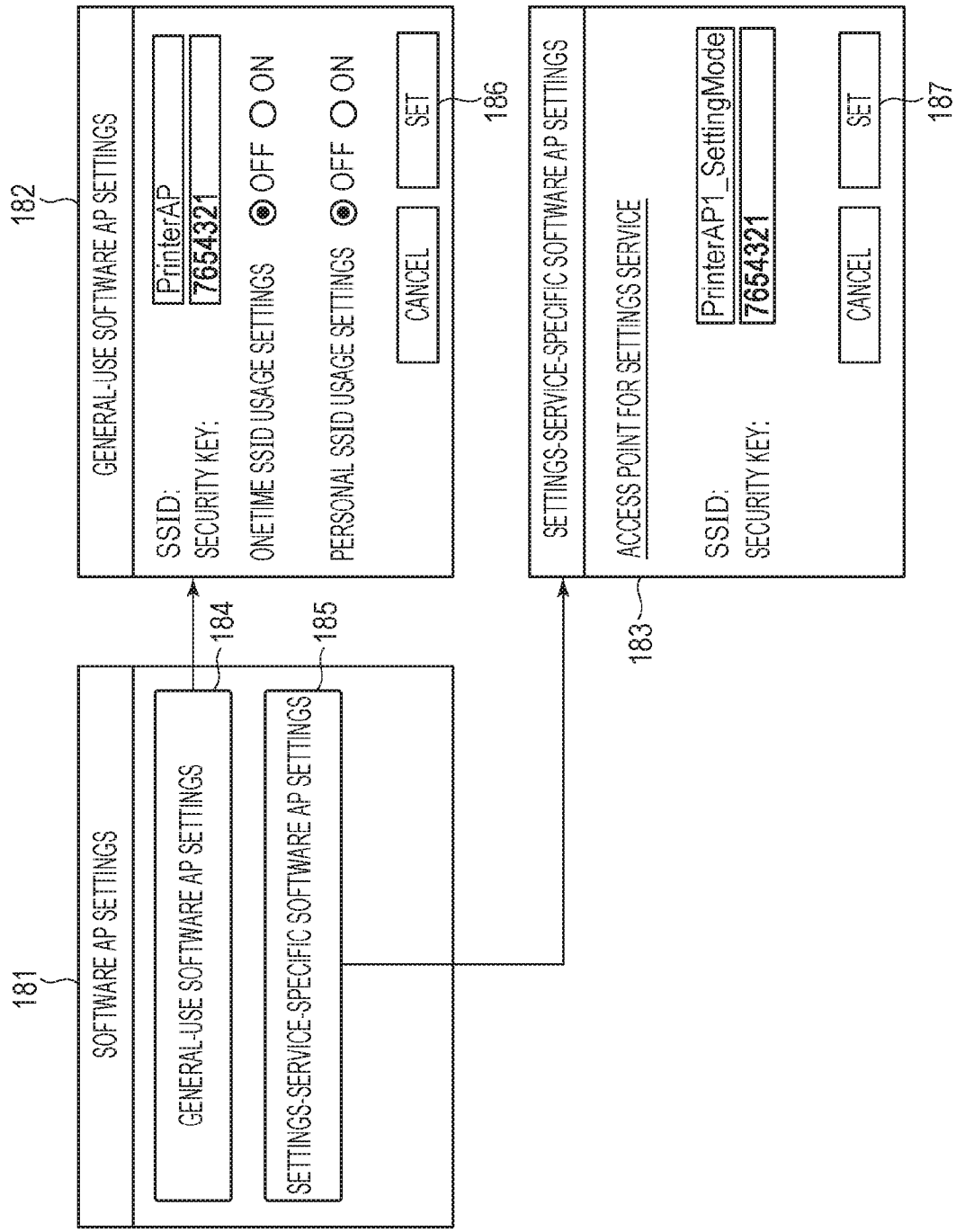
FIG. 11 is a diagram for describing a screen displayed on the operating unit of the MFP.

FIG. 11 shows a screen displayed on the operating unit 136 of the MFP 102. A screen 181 is an exemplification of a software AP settings screen according to the second embodiment, displayed instead of the screen 163 in the first embodiment (FIG. 6). The MFP 102 transitions the display of the operating unit 136 from the settings screen 162 to the screen 181 in accordance with the setting button of the software AP being selected.

A settings button 184 for performing general-use software AP settings to be used for external cooperation, and a settings button 185 for performing settings-service-specific software AP settings, are displayed in the screen 181. The user can select the settings button 184 and change the general-use software AP settings. The MFP 102 accepts the settings changes via a screen 182. Upon the set button 186 in the screen 182 being selected, the MFP 102 applies the settings accepted via the screen 182 as the settings of the MFP 102. The user can also select the settings button 185 and perform settings-service-specific software AP settings. The MFP 102 accepts the settings changes via a screen 183. Upon the set button 187 being selected via the screen 183, the MFP 102 applies the settings accepted via the screen 183 as the settings of the MFP 102. Note that the general-use software AP settings and settings-service-specific software AP settings are stored in the software AP settings 155 within the storage 134.

The MFP 102 uses the different settings stored in the software AP settings 155 in accordance with the purpose of activing the software AP. For example, in a case where activation of the software AP has been instructed via the screen 161 in FIG. 6, the software AP is activated using the general-use software AP settings. Also, in a case where the software AP is to be activated in accordance with the settings service having been activated via the screen 164 in FIG. 6, the software AP is activated using the software AP settings for the settings service.

Figure 12:
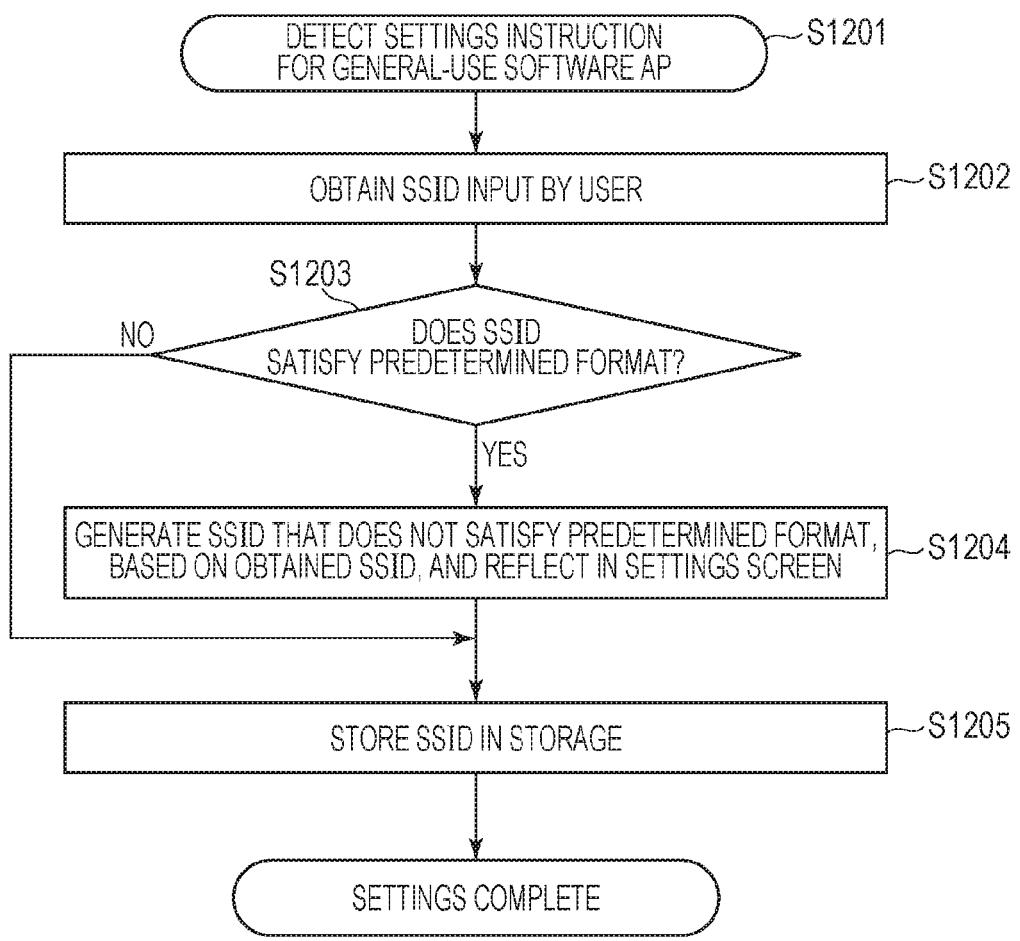
FIG. 12 is a flowchart illustrating control of the MFP.
Figure 13:
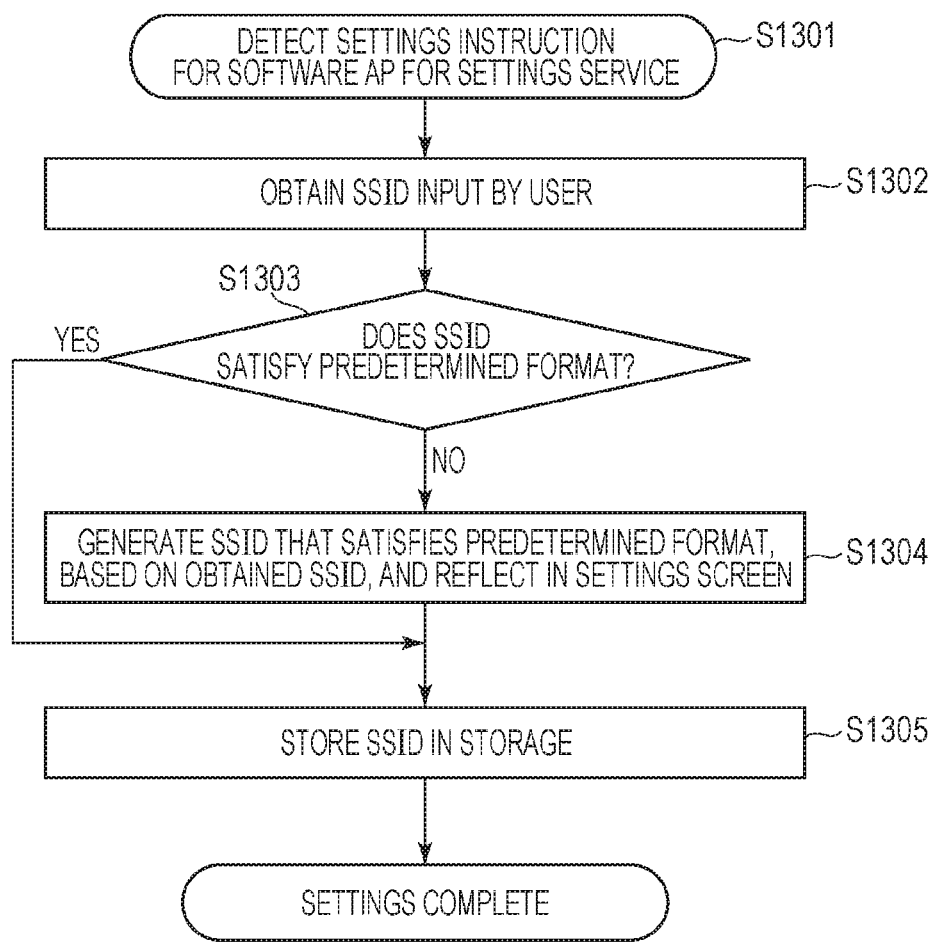
FIG. 13 is a flowchart illustrating control of the MFP.

Next, control relating to settings changes of the software AP in the second embodiment will be described with reference to the flowcharts in FIGS. 12 and 13. The operations (steps) of the flowcharts in FIGS. 12 and 13 are realized by the CPU 131 reading out a program for realizing the control modules stored in the ROM 132 or storage 134, loading the program to the RAM 133, and executing the program. Note that the processing in the flowcharts is realized by the OS 150 that is a control program and UI 151 operating collaboratively.

FIG. 12 is a flowchart illustrating operations of the MFP 102 for when performing operations for general-use software AP settings in the screen 182. In S1201, the CPU 131 detects that the user has pressed the settings button 184 in the screen 182, and starts software AP settings processing for printing. In S1202, the CPU 131 obtains the SSID that the user has input via the screen 182.

In S1203, the CPU 131 determines whether or not the obtained SSID satisfies the predetermined format. In a case where the predetermined format is satisfied, the flow advances to S1204. In a case where the predetermined format is not satisfied, the processing in S1204 is skipped, and the flow advances to S1205.

In S1204, the CPU 131 generates an SSID that does not satisfy the predetermined format, based on the SSID obtained in S1202. For example, the CPU 131 deletes the "_SettingMode" included at the suffix of the SSID, generates an SSID that does not satisfy the predetermined format, and reflects this in the screen 181. Note that the processing of S1203 and S1204 is processing performed as an exception, to keep the settings of an SSID that satisfies the predetermined format conforming to the standard of the settings service from being changed to a general-use software AP SSID. According to this processing, the SSID can be converted into an SSID that does not satisfy the predetermined format, even if the user inputs an SSID that satisfies the predetermined format.

In S1205, the CPU 131 stores the general-use software AP settings in the software AP settings 155 of the storage 134, based on the SSID and other setting items input to the screen 181. Upon the storage being completed, the changes to the general-use software AP settings are completed.

Note that in a case of determining in step S1203 that the obtained SSID satisfies the predetermined format, an error notification may be displayed to the effect that registration cannot be performed, and prompt input of the SSID again. The error notification is a notification to the user to the effect that a text string that cannot be set is included, and the relevant text string. According to this processing, the user can be notified to the effect that that registration cannot be performed unless an SSID that does not include the relevant text string.

FIG. 13 is a flowchart illustrating operations of the MFP 102 when performing operations for settings service software AP settings from the screen 183. In S1301, the CPU 131 detects that the user has pressed the settings button 185 in the screen 181, and starts processing for settings-service-specific software AP settings. In S1302, the CPU 131 obtains the SSID that the user has input via the screen 183. In S1303, the CPU 131 determines whether or not the SSID obtained in S1302 satisfies the predetermined format. In a case where the predetermined format is satisfied, the processing in S1304 is skipped, and the flow advances to S1305. In a case where the predetermined format is not satisfied, the flow advances to S1304.

In S1304, the CPU 131 generates an SSID that satisfies the predetermined format, based on the SSID obtained in S1302, and reflects this in the screen 183. In the present embodiment, the CPU 131 effects control so that the SSID satisfies the format "_SettingMode", as one example. For example, the CPU 131 adds "_SettingMode" at the suffix of the SSID, and generates an SSID that satisfies the predetermined format. Note that in a case where conditions such as the maximum number of characters of the SSID are already set in the standard to which the settings service or settings application confirms, text string operation is performed so that the conditions are satisfied, and an SSID following the standard is generated. Note that the processing of S1304 is processing performed as user support, to automatically make corrections so that the SSID is an SSID that satisfies the predetermined format conforming to the standard of the settings service. According to this processing, the SSID can be converted into an SSID that satisfies the predetermined format, even if the user inputs an SSID that does not satisfy the predetermined format.

In S1305, the CPU 131 stores the security key and SSID accepted via screen 183 as a settings service software AP in the software AP settings 155 of the storage 134. Upon storage being completed, the changes to the settings service software AP settings are completed.

In S1303, in a case where determination is made in S1303 that the SSID does not satisfy the predetermined format, an error notification display may be made to the effect that registration cannot be made, thereby prompting the user to input the SSID again.

As described above, different settings (SSID security key, and encryption mode) are stored for each purpose of the software AP. Accordingly, the software AP can be activated with a different SSID in accordance with the purpose of activating the software AP.

In a case of accepting various software AP settings changes, the SSID after changing is checked. This can keep settings from being changed into an inappropriate SSID. Also, in a case of changing settings of an SSID for the settings service, correction is automatically performed so that the SSID follows the standard of the settings service. Accordingly, when activating the settings service, the software AP can be activated with an SSID following the predetermined format.

Note that the settings service in the present embodiment is a service for performing settings of an MFP in cooperation with an external terminal, with settings values being received from an external terminal such as the communication terminal 101 or the like. The service is a cooperative service where settings of the MFP 102 are changed based on the received settings values.

These settings services may cooperate with external terminals following IoT standards (e.g., IoTivity and AllJoyn) promoted by groups such as the Open Connectivity Foundation (OCF) and AllSeen. In this case, the CPU 111 effects control so that the software AP of an SSID following the specifications of this IoT standard when activating the settings service. This is also applicable to a settings service cooperating with a settings application that a vendor of an MFP provides on its own. Further, this also applicable to a settings service cooperating with a settings application providing printing solutions and the like via the cloud.

Modifications

An example of a predetermined format has been exemplified as a case where "*_SettingMode" is satisfied in the first embodiment, but this is not restrictive. Control may be effected so that a general-use software AP SSID is "*_Printer", for example. That is to say, the SSID may be different for each purpose of activating the software AP. For example, in a case where the MFP 102 corresponds to multiple services using direct wireless communication, the software AP activating each service is controlled to have different SSIDs.

In this case, the MFP 102 changes the software AP activated for each service based on the SSID generating rules defined beforehand. FIG. 14 is a diagram for describing SSID generating rules. For example, the generating rules have the purpose of starting up the software AP, corresponding service, text string to be added to the SSID, the position where this text string is placed (suffix or prefix), stored in a correlated manner. In a case of activating the software AP, the MFP 102 obtains the additional text string and rule stored in a correlated manner with the purpose of activation and the service being activated. The software AP can be activated with an SSID generated so as to satisfy the obtained additional text string and rule.

According to the embodiments described above, SSIDs of a software AP can be switched in accordance with the usage purpose of the software AP, without troubling the user.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-032443 filed Feb. 23, 2017, which is hereby incorporated by reference herein in its entirety.

What is claimed is:

1. An information processing apparatus comprising:
a memory device that stores a set of instructions; and
at least one processor that executes the instructions, the instructions, when executed, causing the information processing apparatus to perform operations including
accepting user instruction for transition of an operation mode of the information processing apparatus to a first mode where network settings of the information processing apparatus are to be performed in cooperation with an external terminal,
performing control, if the information processing apparatus is operating in the first mode, to activate an access point for wireless communication using a service set identifier (SSID) that satisfies a predetermined format, and activate a service for accepting settings relating to the network,
receiving connection information from an external terminal,
changing settings relating to the network of the information processing apparatus by using the activated service, based on the received connection information, and
performing control, if the information processing apparatus is operating in a second mode that is different from the first mode, to activate an access point using an SSID that does not satisfy the predetermined format,
wherein, even if the connection information is received from the external terminal in a state in which the information processing apparatus is operating in the second mode, the settings relating to the network of the information processing apparatus are not changed.

2. The information processing apparatus according to claim 1,
wherein the SSID that satisfies the predetermined format is an SSID that satisfies a rule relating to a software access point (AP) defined in a predetermined IoT standard.

3. The information processing apparatus according to claim 1, further comprising:
a storage device configured to store an SSID,
wherein, upon condition that an instruction to activate an access point in the first mode is accepted, control is effected to generate an SSID that satisfies the predetermined format, based on an SSID stored in the storage device, and the access point is activated using the generated SSID,
and wherein, upon condition that an instruction to activate an access point in the second mode is accepted, control is effected to generate an SSID that does not satisfy the predetermined format, based on an SSID stored in the storage device, and the access point is activated using the generated SSID.

4. The information processing apparatus according to claim 3,
wherein the connection information is connection information for connecting to an access point selected based on user operations via the operating unit, out of a plurality of access points displayed on the operating unit of the external terminal.

5. The information processing apparatus according to claim 3,
wherein the instructions further include an instruction for determining whether or not an SSID stored in the storage device satisfies the predetermined format.

6. The information processing apparatus according to claim 5,
wherein, in the determining, in a case where a text string matching a predetermined text string pattern stored beforehand is included in the SSID, determination is made that the predetermined format is satisfied.

7. The information processing apparatus according to claim 1,
wherein connection information that the service receives is connection information set based on operations via an operating unit of the external terminal.

8. The information processing apparatus according to claim 1,
wherein, in accordance with having accepted the user instruction for transition to the first mode, an access point of the SSID satisfying the predetermined format, and the service, are activated.

9. The information processing apparatus according to claim 1,
wherein, in a case of activating an access point in the first mode,
a current state of the access point is stored, the access point in the first mode is stopped in accordance with having accepted a user instruction to stop usage of the service, and control is effected regarding the state of the access point after having stopped the access point in the first mode.

10. The information processing apparatus according to claim 1, wherein the instructions further include an instruction for accepting a user instruction to stop the access point identified by the SSID that satisfies the predetermined format and stop the service.

11. A control method of a system including an information processing apparatus and a communication terminal, the method comprising:
accepting a user instruction for transition of an operation mode of the information processing apparatus to a first mode where network settings of the information processing apparatus are to be performed in cooperation with an external terminal;
first control, performed by the information processing apparatus, where if the information processing apparatus is operating in the first mode, to activate an access point for wireless communication using a SSID that satisfies a predetermined format, and activate a service for accepting settings relating to the network;
receiving connection information from an external terminal;
changing, performed by the information processing apparatus, of settings relating to the network of the information processing apparatus by using the activated service, based on the connection information;
second control, performed by the information processing apparatus, if the information processing apparatus is operating in a second mode that is different from the first mode, to activate an access point using an SSID that does not satisfy the predetermined format,
wherein, even if the connection information is received in a state in which the information processing apparatus is operating in the second mode, the settings relating to the network of the information processing apparatus are not changed;
displaying, performed by the communication terminal, one or more access points on an operating unit of the communication terminal; and
transmitting, performed by the communication terminal, of connection information for connecting to an access point selected based on user operations, out of a plurality of access points displayed in the displaying, to the information processing apparatus via an access point of an SSID that satisfies the predetermined format.

12. A control method of an information processing apparatus, the method comprising:
accepting a user instruction for transition of an operation mode of the information processing apparatus to a first mode where network settings of the information processing apparatus are to be performed in cooperation with an external terminal;
first control, where if the information processing apparatus is operating in the first mode, to activate an access point for wireless communication using a SSID that satisfies a predetermined format, and activate a service for accepting settings relating to the network;
receiving connection information from an external terminal;
changing, of settings relating to the network of the information processing apparatus by using the activated service, based on the connection information; and
second control, if the information processing apparatus is operating in a second mode that is different from the first mode, to activate an access point using an SSID that does not satisfy the predetermined format,
wherein, even if the connection information is received in a state in which the information processing apparatus is operating in the second mode, the settings relating to the network of the information processing apparatus are not changed.

13. A non-transitory computer readable storage medium storing a program for causing a computer to perform an information processing method, the method comprising:
accepting a user instruction for transition of an operation mode of the information processing apparatus to a first mode where network settings of the information processing apparatus are to be performed in cooperation with an external terminal;
first control, where if the information processing apparatus is operating in the first mode, to activate an access point for wireless communication using a SSID that satisfies a predetermined format, and activate a service for accepting settings relating to the network;
receiving connection information from an external terminal;
changing, of settings relating to the network of the information processing apparatus by using the activated service, based on the connection information; and
second control, if the information processing apparatus is operating in a second mode that is different from the first mode, to activate an access point using an SSID that does not satisfy the predetermined format,
wherein, even if the connection information is received in a state in which the information processing apparatus is operating in the second mode, the settings relating to the network of the information processing apparatus are not changed.

* * * * *